No. 835,927. PATENTED NOV. 13, 1906.
T. A. S. WOOD.
APPARATUS FOR DYEING, &c.
APPLICATION FILED AUG. 13, 1906.
3 SHEETS—SHEET 1.
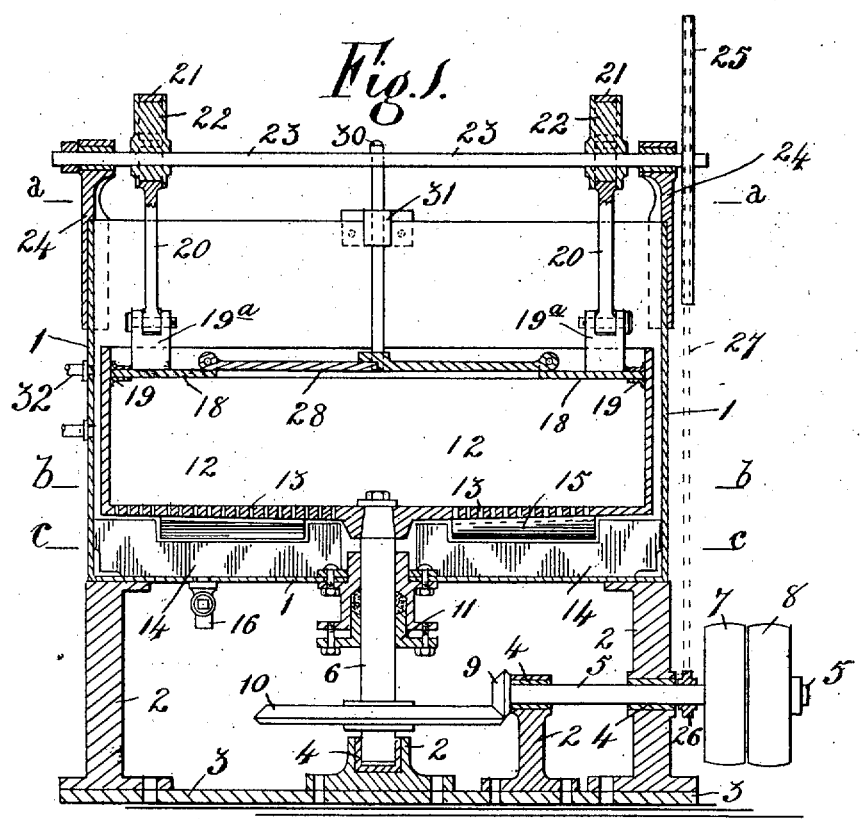
Witnesses:
Inventor
Thomas A. S. Wood
By
James L. Norris.
Atty.

No. 835,927. PATENTED NOV. 13, 1906.
T. A. S. WOOD.
APPARATUS FOR DYEING, &c.
APPLICATION FILED AUG. 13, 1906.
3 SHEETS—SHEET 2.
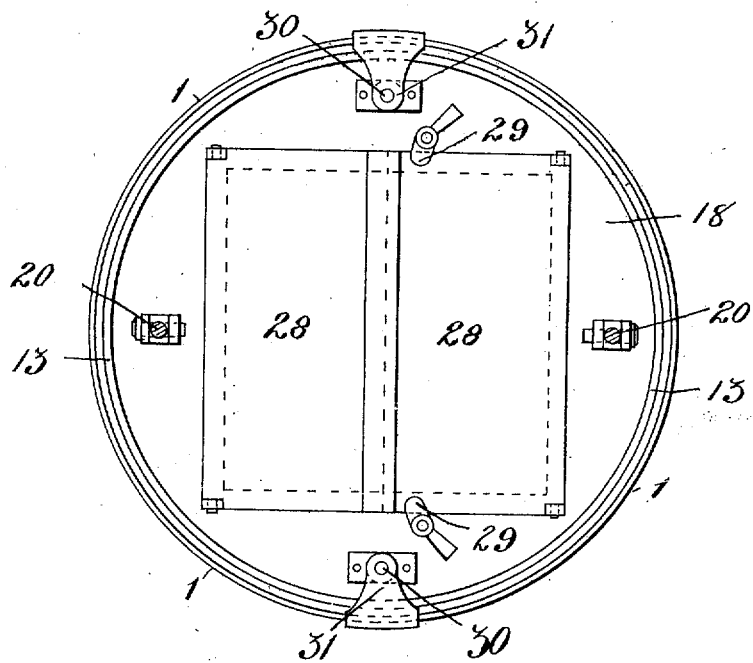
Witnesses:
James L. Norris, Jr.
C. D. Kesler
Inventor
Thomas A. S. Wood
By
James L. Norris.
Atty.

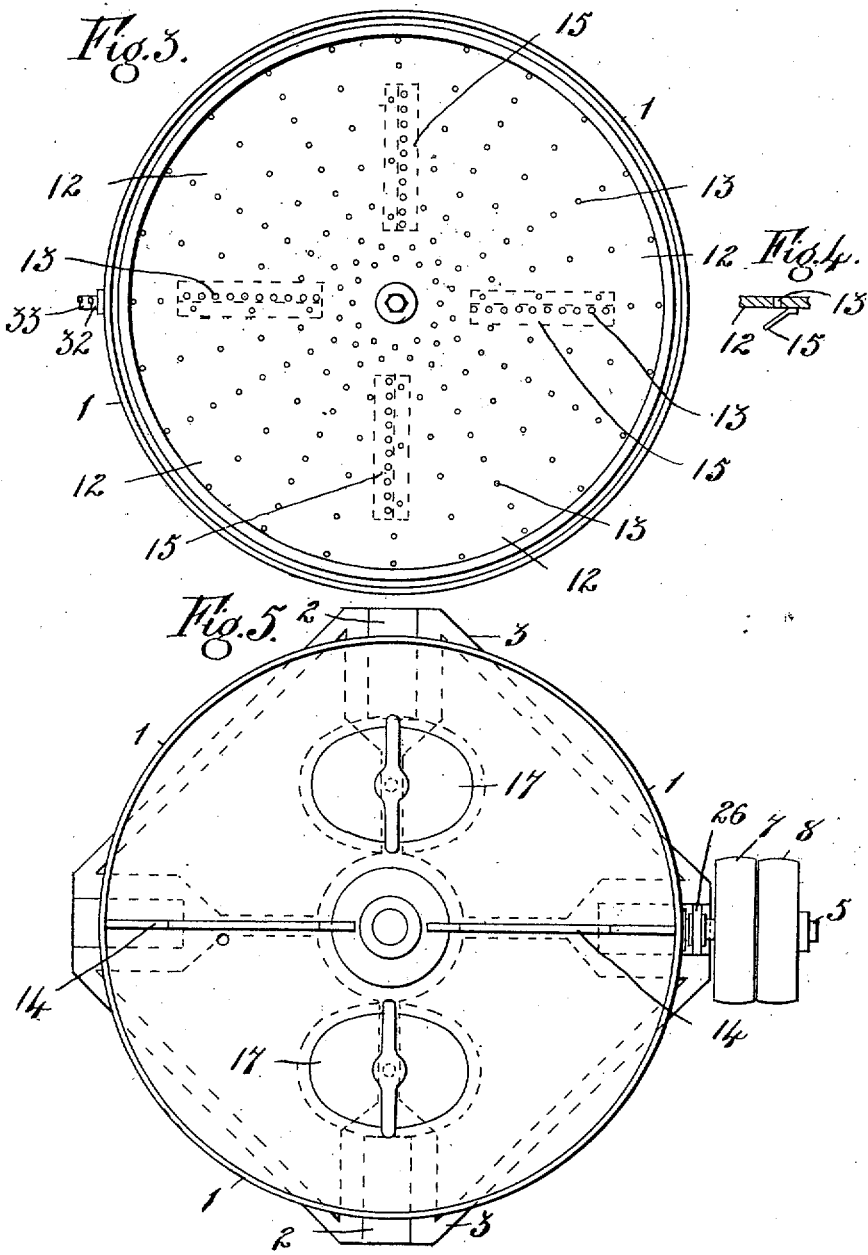

UNITED STATES PATENT OFFICE.

THOMAS ALEXANDER STEPHEN WOOD, OF LONDON, ENGLAND.

APPARATUS FOR DYEING, &c.

No. 835,927.  Specification of Letters Patent.  Patented Nov. 13, 1906.

Application filed August 13, 1906. Serial No. 330,435.

*To all whom it may concern:*

Be it known that I, THOMAS ALEXANDER STEPHEN WOOD, a subject of the King of Great Britain, residing at 4 St. Thomas road, Craven Park Road, Harlesden, London, England, have invented certain new and useful Improvements in Apparatus for Cleaning, Dyeing, or otherwise Treating Wool, Hair, Cotton, and Other Animal or Vegetable Fibrous or Textile Material, of which the following is a specification.

The object of this invention is to construct a machine or apparatus for cleaning, dyeing, or otherwise treating wool, hair, cotton, and other fibrous or textile material, the cleaning being effected in a short time, at little expense, in a thoroughly efficient manner, and without detriment to the material under operation.

My invention will be clearly understood from the following description, aided by the accompanying drawings, in which—

Figure 1 is a longitudinal sectional elevation of a machine. Fig. 2 is a plan on the line $a\,a$ of Fig. 1. Fig. 3 is a plan on the line $b\,b$ of Fig. 1. Fig. 4 is a section of a portion of the bottom of the revolving cage, showing a diverting-plate in position, as will be more particularly hereinafter described. Fig. 5 is a plan on the line $c\,c$ of Fig. 1.

According to my invention I mount a tank 1 on standards 2 of a base-plate 3, said standards 2 having bearings 4, carrying shafts 5 6, the horizontal shaft 5 carrying on the outer end fast and loose pulleys 7 8 and on the inner end a bevel-pinion 9, meshing with a larger bevel-pinion 10 on the vertical shaft 6, this resting in a cup-bearing 4 at its lower end and passing through a stuffing-box 11, fixed to the bottom of the tank 1, and carrying at its upper end a revolving cage 12, said revolving washer 12 having its bottom perforated with holes 13.

On the bottom of the tank 1 I affix stationary blades 14, (two or more,) these reaching close to the bottom of the revolving cage 12 and having recessed portions to allow of passage of angled plates 15, affixed to the bottom of the revolving cage 12. The bottom of the tank 1 is provided with draw-off tap 16 to draw off the liquid contained therein, and also with manholes 17 to allow of the tank being cleaned when required, these manholes being of the usual construction.

Inside the revolving cage I fit a piston or plunger 18, preferably having a packing 19 around the edge to fit the revolving cage somewhat tightly, and such piston or plunger 18 is provided with blocks 19$^a$, to which is pivotally connected rods 20, having sleeves 21 encircling eccentrics 22 on a shaft 23, carried by brackets 24, projecting above the tank 1. The shaft 23 carries a pulley or wheel 25, this being in gear with a pulley or wheel 26 on the axle 5 by belt 27, chain, or other gear, so as to produce a reciprocating action of the plunger 18.

The plunger 18 has a space or opening at its center closable by doors 28, which are kept closed by the catch 29, pivoted to the plunger 18.

30 designates guide-rods on the plunger 18 and working in eyes 31, projecting from the tank, to insure the plunger 18 being kept in proper position and angle.

32 is a water-inlet pipe, and 33 a steam-pipe for the admission of steam to heat the water or liquid to the desired temperature when required.

In action water is admitted into the tank 1 by an inlet 32 and heated by steam from the inlet 33 up to the desired temperature. The cleaning, dyeing, or other material is then placed in the tank 1 and admixed with the water. The doors 28 are opened, and the material to be cleaned, dyed, or otherwise treated is placed in the revolving cage 12 and the doors shut and fastened down. The belt running the loose pulley 8 is now transferred to the fixed pulley 7, and the power from the prime mover revolves the revolving cage 12 through the gear 5, 9, 10, and 6. At the same time the belt 27 operates the wheel 25 and causes the eccentric 22 to impart a reciprocating motion to the plunger 18, the reciprocation being timed with the revolving of the cage 16, preferably one complete movement of the plunger 18 to one revolution of the washer 12; but it may be one of the plunger to two of the cage, or otherwise.

The blades 14 are for the purpose of keeping the water in the bottom of the tank 1 as still as possible and to prevent it swirling round, due to the centrifugal action of the washer 12, and the angled blades 15 pick up the water and conduct it through the perforations 13 next their stops and into the cage, the perforations immediately above the blades 15 being larger than the others for easy passage.

The centrifugal action of the cage 12 causes the liquid outside and inside of it to swirl round and to carry round the material under treatment with a tendency to carry same at a great rate; but the reciprocating action of the plunger 18 (which has a movement about one-third the depth of the cage 12) in its downward movement forces a great portion of the liquid in the cage out through the perforations, at the same time carrying down the material, checking its revolving actions, thus opening it out and during the upward movement create a suction or partial vacuum action in the cage, lifting the material and at the same time opening it out, so that the liquid-cleanser can have full action on all parts of the material, the material constantly changing its position, due to the swirling action of the revolving cage and the suction and ejection action of the plunger.

What I claim, and desire to secure by Letters Patent, is—

The improved construction of apparatus for cleaning, dyeing, or otherwise treating wool, hair, cotton, and other animal or vegetable fibrous or textile material, consisting of a fixed tank 1 having blades 14 across the bottom, steam-inlet 33, water-inlet 32, draw-off tap 16 and manholes 17; a revolving cage 12 situate within tank 1 and operated by gear outside of said tank, a reciprocating plunger or piston 18 arranged in said washer 12 and operated by gear outside said tank 1, doors 28 inclosing an opening in said plunger, angled plate 15 on bottom of cage 12, all arranged and acting substantially as set forth.

In testimony whereof I have hereunto set my hand in presence of two subscribing witnesses.

THOMAS ALEXANDER STEPHEN WOOD.

Witnesses:
RICHARD CORE GARDNER,
LYNWOOD FERDINAND GARDNER.